(12) United States Patent
Redpath

(10) Patent No.: US 9,544,150 B2
(45) Date of Patent: Jan. 10, 2017

(54) USING MULTIPLE DIGITAL IDENTIFICATION DOCUMENTS TO CONTROL INFORMATION DISCLOSURE

(71) Applicant: International Business Machines Corporation, Armonk, NY (US)

(72) Inventor: Richard Redpath, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 14/295,892

(22) Filed: Jun. 4, 2014

(65) Prior Publication Data
US 2015/0358166 A1    Dec. 10, 2015

(51) Int. Cl.
G06F 7/04 (2006.01)
H04L 9/32 (2006.01)
G06Q 10/00 (2012.01)
H04L 29/06 (2006.01)
G06F 21/64 (2013.01)

(52) U.S. Cl.
CPC ............ H04L 9/3247 (2013.01); G06F 21/64 (2013.01); G06Q 10/00 (2013.01); H04L 63/00 (2013.01)

(58) Field of Classification Search
CPC ........................................................ H04L 9/32
USPC ..................................................... 726/17–19
See application file for complete search history.

(56) References Cited

U.S. PATENT DOCUMENTS 6,622,015 B1    9/2003  Himmel et al.
7,069,443 B2 *  6/2006  Berringer ................ G06F 21/64
                                                            713/175
7,073,063 B2    7/2006  Peinado
8,215,546 B2    7/2012  Lin
8,925,075 B2   12/2014  Krendelev et al.
(Continued)

FOREIGN PATENT DOCUMENTS

WO    2010130230 A1    11/2010
WO    2013072374 A1     5/2013

OTHER PUBLICATIONS

Kuklinski et al., "The Use of ID Reader-Authenticators in Secure Access Control and Credentialing," Technologies for Homeland Security, 2008 IEEE Conference on Year: 2008 pp. 246-251.*

(Continued)

*Primary Examiner* — Roderick Tolentino
(74) *Attorney, Agent, or Firm* — Nicholas D. Bowman

(57) ABSTRACT

A first digital identification document is transmitted from an identification authority to a mobile device of an identified individual. This first digital identification document is digitally signed and includes a set of attributes about the identified individual. In the same manner, a second digital identification document is also transmitted to the identified individual's mobile device. The second digital identification document is also digitally signed but includes a different set of attributes about the identified individual. The identified individual is then confronted by a series of challengers, wherein each challenger requires a different amount of information about the identified individual. Based on the identity of each challenger, the identified individual selects an appropriate identification document and transmits it to the applicable challenger's device. The challenger is then able to confirm both the information he needs about the identified individual and the validity of the identification document that he receives.

3 Claims, 5 Drawing Sheets

(56) References Cited

U.S. PATENT DOCUMENTS

| | | | |
|---|---|---|---|
| 9,230,133 B2* | 1/2016 | Abt, Jr. | G06F 21/6245 |
| 9,230,135 B2 | 1/2016 | Abt, Jr. et al. | |
| 2002/0029337 A1 | 3/2002 | Sudia et al. | |
| 2002/0194476 A1 | 12/2002 | Lewis et al. | |
| 2005/0021479 A1 | 1/2005 | Jorba et al. | |
| 2008/0071688 A1 | 3/2008 | Corbett et al. | |
| 2008/0133418 A1 | 6/2008 | Lehmann et al. | |
| 2008/0268904 A1 | 10/2008 | Tanaka | |
| 2008/0307223 A1* | 12/2008 | Brickell | H04L 63/126 713/158 |
| 2009/0106110 A1 | 4/2009 | Stannard et al. | |
| 2009/0106846 A1* | 4/2009 | Dupray | G06Q 40/02 726/26 |
| 2010/0122315 A1* | 5/2010 | Stollman | G06F 21/606 726/1 |
| 2011/0028212 A1* | 2/2011 | Krien | A47G 33/004 463/32 |
| 2011/0145593 A1 | 6/2011 | Auradkar et al. | |
| 2011/0321127 A1* | 12/2011 | Pitroda | G06Q 20/02 726/3 |
| 2012/0090038 A1* | 4/2012 | Pacella | G06Q 20/32 726/30 |
| 2012/0163584 A1 | 6/2012 | Adjedj | |
| 2012/0239932 A1 | 9/2012 | Allepuz et al. | |
| 2012/0278865 A1* | 11/2012 | Sawdy | G06Q 50/265 726/4 |
| 2013/0159730 A1 | 6/2013 | Asim et al. | |
| 2016/0063280 A1 | 3/2016 | Abt et al. | |

OTHER PUBLICATIONS

Liu et al., "Research in Techniques of Personal Identity Management," Control Engineering and Communication Technology (ICCECT), 2012 International Conference on Year: 2012 pp. 912-915.*

Coogan, G., "May I see your smartphone and registration please?", http://mobilepaymentstoday.com/blogs/8769/May-I-see-your-smart . . . , Aug. 28, 2012 (last accessed Apr. 25, 2014 3:50 PM).

IBM, "IBM Mobile Identity," IBM Emerging Technologies—jStart—On the Horizon—Mobile Identity, http:/www-01.ibm.com/software/ebusiness/jstart/mi (last accessed Apr. 9, 2014 11:06 AM).

IBM, "Identity governance," IBM Research—Zurich, Computer Science, Idemix, http:/www.zurich.ibm.com/security/idemix, (last accessed Apr. 9, 2014 11:18 AM).

IBM, "Mobile Identity: A cryptographic framework for issuing, managing, and challenging digital identification documents," http://www-01.ibm.com/software/ebusiness/jstart/dowloads/mi6x20.pdf.

Keolabs, "ISO18013 e-Driving License Confor+mance Solutions," http://www.keolabs.com/iso18013.html, (accessed May 29, 2014, 1:21 PM).

Microsoft, "U-Prove," http:/research.microsoft.com/en-us/projects/u-prove (last accessed Apr. 9, 2014 11:19 AM).

New York State, Department of Environmental Conservation, "Lifetime Sporting Licenses," http://www.dec.ny/gov/permits/6099.html, Copyright © 2014 New York State Department of Environmental Conservation (accessed May 29, 2014, 1:19 PM).

Toups, D., "License, registration and smartphone," http://www.carinsurance.com/Articles/states-smartphone-proof-of-insura . . . (last updated Mar. 31, 2014; last accessed Apr. 25, 2014 3:52 PM).

Wong, A., "Driver's Licenses Contain Too Much Personal Info to Use at a Bar," Future Tense, ASU, The Citizen's Guide to the Future (last modified Apr. 4 2014 9:46 AM, last accessed Apr. 9, 2014 10:59 AM).

ABT, William F. et al, "Secure Access for Sensitive Digital Information," U.S. Appl. No. 14/154,615, filed Jan. 14, 2014.

Gisolfi, Daniel A., et al, "Management of Digital Copies of Registrations Using Mobile Devices," U.S. Appl. No. 14/278,552, filed May 15, 2014.

IBM, "List of IBM Patents or Patent Applications Treated as Related."

IBM, "List of IBM Patents and Patent Applications Treated as Related", Jun. 15, 2016, 2 pages.

* cited by examiner

USING MULTIPLE DIGITAL IDENTIFICATION DOCUMENTS TO CONTROL INFORMATION DISCLOSURE

BACKGROUND

The present disclosure relates to managing multiple digital identification documents, more specifically, managing sets of such documents in situations where the individual documents within the sets include differing amounts of sensitive information about identified individuals.

Individual identification systems are used by various entities (e.g., governments, organizations, and businesses) for a myriad of purposes in situations where being able to verify quickly the identity of individuals is important. While these individual identification systems can be very different, they often share a number of common characteristics. One such commonality is the issuance of identification documents to identified individuals. In some instances, these identification documents include images or other verifiable identifiers that can be used to link a particular identified individual with certain rights or privileges. For example, a driver's license issued by a state department of motor vehicles may include an image of a particular licensed driver, and, by examining this license, a state police officer who stops that particular licensed driver may be able to confirm easily both that the license belongs to the driver (by comparing the driver to the image on the license) and that the driver is licensed to drive a vehicle (by noticing that the document is in fact a driver's license).

SUMMARY

According to embodiments of the present disclosure, aspects of the disclosure include a computer program product and a system for managing digital identification documents. In some embodiments, a plurality of digital identification documents is transmitted to a computer of an identified individual. Each digital identification document includes a differing set of attributes about the identified individual and a digital signature. A selected digital identification document is then received from a first mobile device of the identified individual. The digital signature of the selected digital identification document is analyzed to confirm its validity.

In some embodiments, a computer of an identified individual receives a plurality of digital identification documents, each such document including a differing plurality of attributes about the identified individual, from a computer system of a representative of an identification authority. Confronted by a first challenger, the identified individual's mobile device provides him with a user interface from which he can make a first selection of a first digital identification document from the plurality of digital identification documents. Based on the first selection, the mobile device transmits the first digital identification document to the first challenger's device, whereby the first challenger can determine whether the first digital identification document is valid. Further, in some embodiments, the identified individual is then confronted by a second challenger. The user interface is once again provided by the mobile device, and the identified individual can make a second selection, this time selecting a second digital identification document of the plurality of digital identification documents. Based on the second selection, the mobile device transmits the second digital identification document to the second challenger's device, whereby the second challenger can determine whether the second digital identification document is valid. Further, in some embodiments, the computer and mobile device of the identified individual are the same device, and the first challenger's device and the second challenger's device are also mobile devices.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
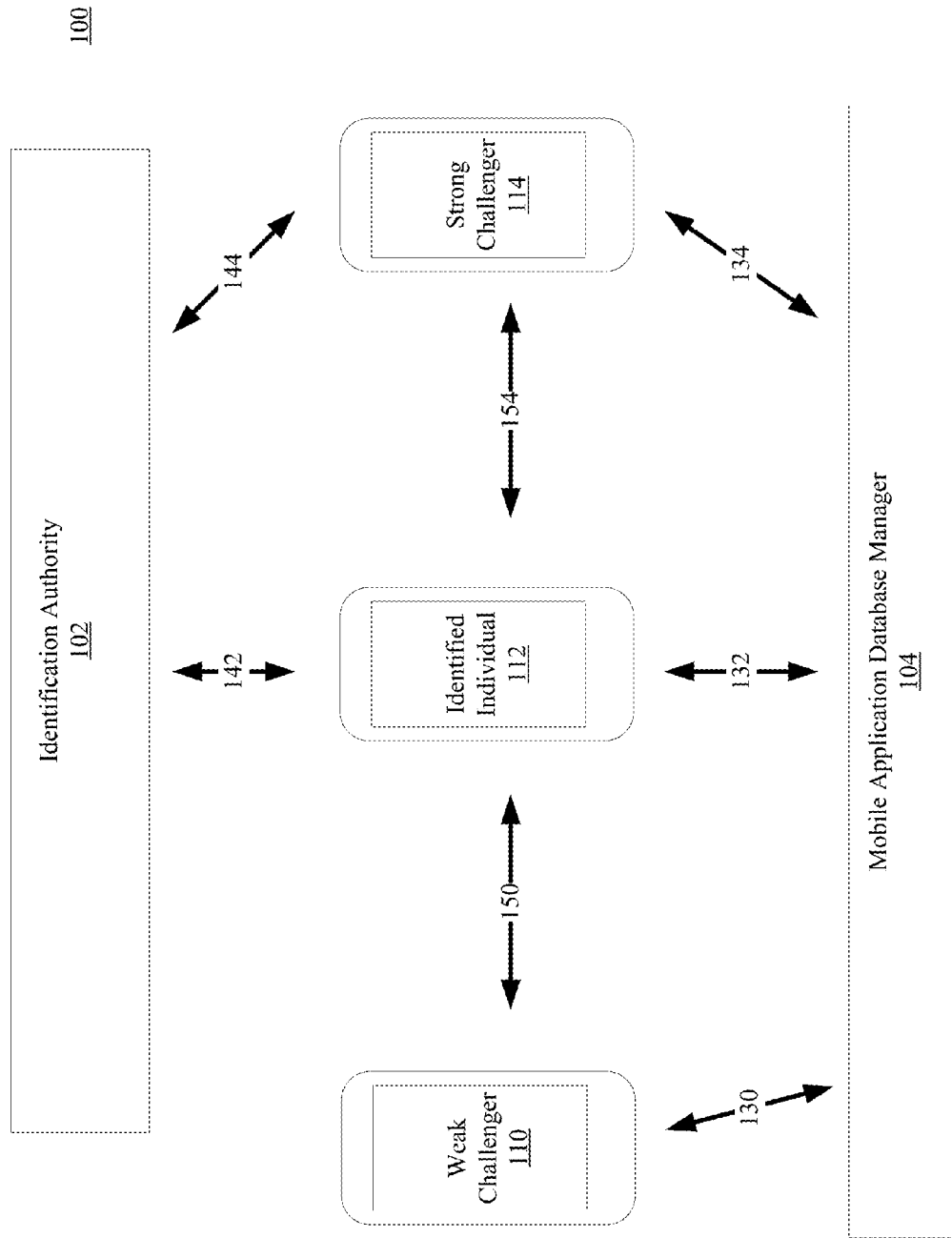
FIG. 1 is a diagrammatic illustration showing various interactions that may occur between mobile devices and other computer systems, in accordance with embodiments of an individual identification system of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing multiple digital identification documents. While the present disclosure is not necessarily limited to such applications, various aspects of the disclosure may be appreciated through a discussion of various examples using this context.

As used herein, an identification authority refers to an entity that controls or requires an individual identification system (e.g., a state government, a private business, a public library, etc.) or agents or subagents that manage all or portions the individual identification system on that entity's behalf (e.g., a department of motor vehicles, a security officer who issues a company's employee identification documents, etc.). Further, as used herein, an identification document refers to a document (i.e., electronic or printed matter containing information) that acts as proof of the identity of an identified individual.

When an identification authority issues an identification document, it will often be the case that other entities will rely on the identification document, even in situations where that is not the intent (or at least not the primary intent) of the identification authority. In these situations, the attributes (i.e., identifiable or verifiable characteristics) of an identified individual included in an identification document may not be appropriate to disclose under the circumstances. For instance, government identity cards provide a host of useful identity information. Much of this information, however, can be surplus for any particular transaction, challenge, or verification. A retailer needing to verify that a customer's name matches that of a credit card may not need information about the customer's address, age, weight, or other information on the card. A seller of age restricted goods (e.g., alcohol, cigarettes, or firearms) may need to know that the customer is older than the restricted age, but not his address, actual age, or other information.

Aspects of the present disclosure are directed toward providing an identified individual with control over the disclosure of his identity information by facilitating the presentation of subsets of the set of available identity information depending upon the particular need, while still providing challengers the ability to verify both the identity of the identified individual and the authenticity of a provided identification document.

In some embodiments, control over the disclosure of sensitive information takes the form of an identified individual having multiple digital identification documents, all issued by the same identification authority, and all stored on (or at least accessible from) a single mobile device. One document of each set, referred to herein as a strong identification document, may include several pieces of information about the identified individual, including, for example, those attributes that may typically be included on driver's licenses (age, address, driver's license number, etc.). The other digital identification documents issued to that same identified individual, which may be referred to herein as weak identification documents, may each include less information about an identified individual than the corresponding strong identification document. By having this set of two or more identification documents available to him, an identified individual can choose the appropriate amount or type of information to disclose in any given situation.

Furthermore, in order to aid in verification or authentication of these digital identification documents, each document may, upon its issuance by an identification authority, be digitally signed using a private key of the identification authority. When challenged, the identified individual may then be able to transmit a selected digital identification document to the challenging party (i.e., challenger), who can then verify the authenticity of the identification document using a public key corresponding to the private key originally used to sign the document.

It is contemplated that within a given embodiment of an individual identification system of the present invention, an identification authority can issue one or more digital identification documents to each of hundreds or thousands of identified individuals. In some embodiments, these identification documents may be revocable or are subject to expiration, and identification authorities can have policies detailing the conditions under which these identification documents may be obtained, maintained, and (in some cases) revoked.

As used herein, the role of challenger may refer to an individual or entity that is entrusted by another individual or entity with the responsibility of verifying the identity of identified individuals. The challenger may or may not be directly associated with, or be an employee of, an identification authority. In some embodiments, the challenger role is divided into strong challengers and weak challengers. The role of strong challenger can include a challenger that is responsible for enforcing laws or ensuring that identified individuals have certain license rights. A strong challenger could include, for example, a state peace officer responsible for checking hunting licenses (issued by the state's wildlife agency) during hunting season. A weak challenger may include a challenger having lesser responsibilities or rights. In some embodiments, a weak challenger may be responsible for verifying that an identified individual is at least a minimum age. An example of a weak challenger is a bartender who checks the ages on identification documents before serving alcoholic beverages.

Turning to the figures, FIG. 1 is a diagrammatic illustration showing various interactions that may occur among mobile devices and other computer systems, in accordance with embodiments of an individual identification system 100 of the present invention. As is discussed in more detail below and shown in FIG. 5, each of computers 102-114 of individual identification system 100 may comprise a wide variety of computers systems and computing environments. In the illustrated embodiment, computers 110, 112, and 114 are mobile devices. The mobile devices 110-114 may include, for example, any mobile or handheld electronic devices, such as laptops, mobile phones, smart phones, tablets, personal or enterprise digital assistants, and the like. Each mobile device 110-114 is associated with (e.g., belongs to) an individual or entity that has one or more of the roles discussed in detail above. In the illustrated embodiment, mobile devices 110, 112, and 114 are associated with individuals having the roles of weak challenger, identified individual, and strong challenger, respectively. It should be noted that the three mobile devices 110-114 of FIG. 1 are shown for illustrative purposes only; it is contemplated that dozens, hundreds, or even thousands of mobile devices may be used, consistent with some embodiments of the present invention. Further, in some embodiments, challengers and identified individuals associated with an individual identification system 100 may use a variety of non-mobile computers in some situations; this may occur, for example, in situations where mobility is not necessary for a particular challenger (e.g., where a challenger is a cashier at a fixed store checkout desk) or where an identified individual uses a non-mobile device in combination with a mobile device (e.g., where an identified individual downloads a digital identification document onto his desktop computer with plans to later transfer a copy of the document to his mobile device).

In some embodiments, computer systems 102 and 104 are associated with an identification authority and a mobile application database manager, respectively. The mobile application database manager of computer system 104 refers to the operator of a digital distribution platform for delivering software to an end user. An example of such a platform is an application store having downloadable applications (i.e., apps) for use on smart phones or other mobile devices. In some embodiments of individual identification system 100, a specific mobile application (or one of several similar mobile applications that are each designed to be compatible with a different operating system) is required in order for an identified individual to use individual identification system 100. For example, a copy of a mobile application may be required to download a digital identification document from an identification authority (e.g., the identification authority operating computer system 102). In some embodiments, an identified individual has the option of not using individual identification system 100 or only using a portion of the components of the system. This can occur, for example, where an identified individual chooses to receive a traditional laminated identification document from an identification authority or a copy of an identification document that is digital but does not otherwise meet the requirements to be used with individual identification system 100 (e.g., in some embodiments, a PDF-copy of an identification document that is not digitally-signed).

In some embodiments, a separate computer system 104 for a mobile application database manager is not required. This occurs, for example, where an identification authority allows the downloading of mobile applications from its own network (e.g., from computer system 102) or otherwise effectively acts as a mobile application database manager for its own mobile applications. It is further contemplated that in some embodiments no specialized mobile applications are required for a user to effectively utilize an individual identification system according to embodiments. This occurs, for instance, where general purpose software preinstalled on a user's mobile device or other computer can be used instead of a downloaded mobile application.

Consistent with some embodiments, there may be several different digital interactions 130-154 among the computers 102-114 of the individual identification system 100. Each of 130-154 represent one or more interactions between two given categories of computers during the use of registration system 100. In some embodiments, the digital interactions 130-154 can be implemented by any number of any suitable communications media (e.g., wide area network (WAN), local area network (LAN), Internet, Intranet, etc.). Alternatively, computers 102-114 may be local to each other during digital interactions 130-154, and can communicate via any appropriate local communication medium (e.g., local area network (LAN), hardwire, wireless link, Intranet, near field communication, Bluetooth connection, ad hoc wireless network, etc.).

Digital interactions 130, 132, and 134 represent interactions between a mobile application database manager (i.e., computer system 104) and mobile devices 110, 112, and 114, respectively. In some embodiments, the digital interactions 130-134 can include downloading (or, more specifically, taking the steps necessary to download) one or more mobile applications from the mobile application database manager to each applicable mobile device. In some embodiments, a downloaded application includes the software necessary to use and manage (e.g., receive, copy, transmit, etc.) digital identification documents in accordance with individual identification system 100. In some embodiments, digital interactions 130-134 can also include downloading periodic updates, patches, or new versions of applicable software. Further, some embodiments may not require any special permissions or verification steps for interactions 130-134 to occur, as the applicable software may be designed and designated for use by the public generally.

As an example of digital interaction 130, a bartender (weak challenger) may download a copy of his country's digital identification card verification app from an application store (computer system 104) onto his smart phone (mobile device 110) so he can verify the validity of his patrons' digital identification cards. An example of digital interaction 132 is a student (identified individual) downloading his university's mobile software from a database (computer system 104) to his mobile phone (mobile device 112), so he can later get a digital university access card from campus security. Further, as an example of digital interaction 134, a highway patrol officer (strong challenger) may download onto his patrol car laptop (mobile device 114) a copy of a state driver's license verification app from a state-funded website (computer system 104) so that he can thereafter use his laptop to determine if drivers he stops have valid licenses.

Another subset of digital interactions 130-154 includes digital interactions 142 and 144, which represent interactions between the computer system 102 of an identification authority and mobile devices 112 and 114, respectively. In some embodiments, digital interactions 142 and 144 are the means by which an identification authority communicates with mobile devices regarding a particular digital identification document, specifically, or regarding an entire individual identification system 100, generally. The computer system 102 of an identification authority can require that specific credentials (e.g., passwords, etc.) be provided in order for a user of the computer system to access specific content that is restricted or particularly sensitive. In some embodiments, this means that access to content stored by the identification authority is less broadly disseminated than content stored by its associated mobile application database manager (e.g., in situations where the applicable mobile applications are downloadable by the public generally).

In some embodiments, digital interactions 142 (i.e., between the computer system 102 of an identification authority and a mobile device 112 of an identified individual) include, for example, downloading a digital identification document or selecting sensitive information to be included in digital identification document. More specifically, an example of a digital interaction 142 includes an insured employee obtaining a digital healthcare card from his employer's health insurance provider.

In some embodiments, digital interactions 144 are between an identification authority (computer system 102) and a strong challenger (mobile device 114) associated with the identification authority. Examples of digital interactions 144 include downloading a revocation database and downloading updates to a revocation database. More specifically, an example of a digital interaction 144 includes a state wildlife officer downloading the state's database of hunting licenses that have been revoked for failure to pay an annual fee.

A third subset of digital interactions 130-154 includes digital interactions 150 and 154. As discussed in more detail below, these interactions include transmitting digital identification documents to challengers for the purpose of identity verification. Digital interactions 150 are between a mobile device 110 of a weak challenger and a second mobile device 112 of an identified individual. An example of a digital interaction 150 is Jane (identified individual) transmitting a virtual identification card not including the her age, her address, or her driver's license number (weak identification document) to a cashier (weak challenger), so that the cashier can confirm that Jane is the actual owner of the credit card she is using to purchase goods at a store. Similarly, digital interactions 154 are between a mobile device 112 of an identified individual and a mobile device 114 of a strong challenger. An example of a digital interaction 154 is when Jane (identified individual) is stopped by a police officer (strong challenger) during a traffic stop and provides him with a second identification card, this one including her age, address, and driver's license number (strong identification document).

Because of the potentially sensitive information transferred during the use an individual identification system 100, each of the digital interactions 130-154 may incorporate one or more security features. One such security feature can include the incorporation of digital certificates (e.g., one or more electronic documents managed in accordance with the X.509 standard for a public key infrastructure) in interactions among the computers 102-114. For example, an identified individual's mobile device 112 may be able to use a digital certificate sent in conjunction with a downloaded copy of a mobile application (in digital interaction 132) in order to verify that the app was truly sent by the mobile application database manager (computer system 104). Further, in some embodiments, the design format and information content of digital identification documents may incorporate one or more standards that promote secure data management (e.g., ISO18013 Electronic Driving License Standard).

In some embodiments, security features incorporated in digital interactions 130-154 take the form of key pairs, including asymmetric key pairs. For example, in a digital interaction 142, Rivest-Shamir-Adleman (RSA) public-key encryption could be used when transmitting a particular digital identification document from an identification authority (computer system 102) to an identified individual (mobile device 110). Further, in some embodiments, the Digital Signature Algorithm (DSA) or variant thereupon, such as the Elliptic Curve DSA (ECDSA), could be used. One skilled in the art would appreciate that many other encryption schemes could be suitable for use with some embodiments of the invention.

In some embodiments, other potential security features include the use of short range communications not requiring intermediaries for these digital interactions 130-154. In these embodiments, a series of steps are involved whereby a short range communication medium is used to establish a secure connection between respective devices (e.g., between mobile devices 110 and 112 or between mobile devices 112 and 114). In some embodiments, near field communication and Bluetooth are suitable short range communication protocols.

Figure 2:
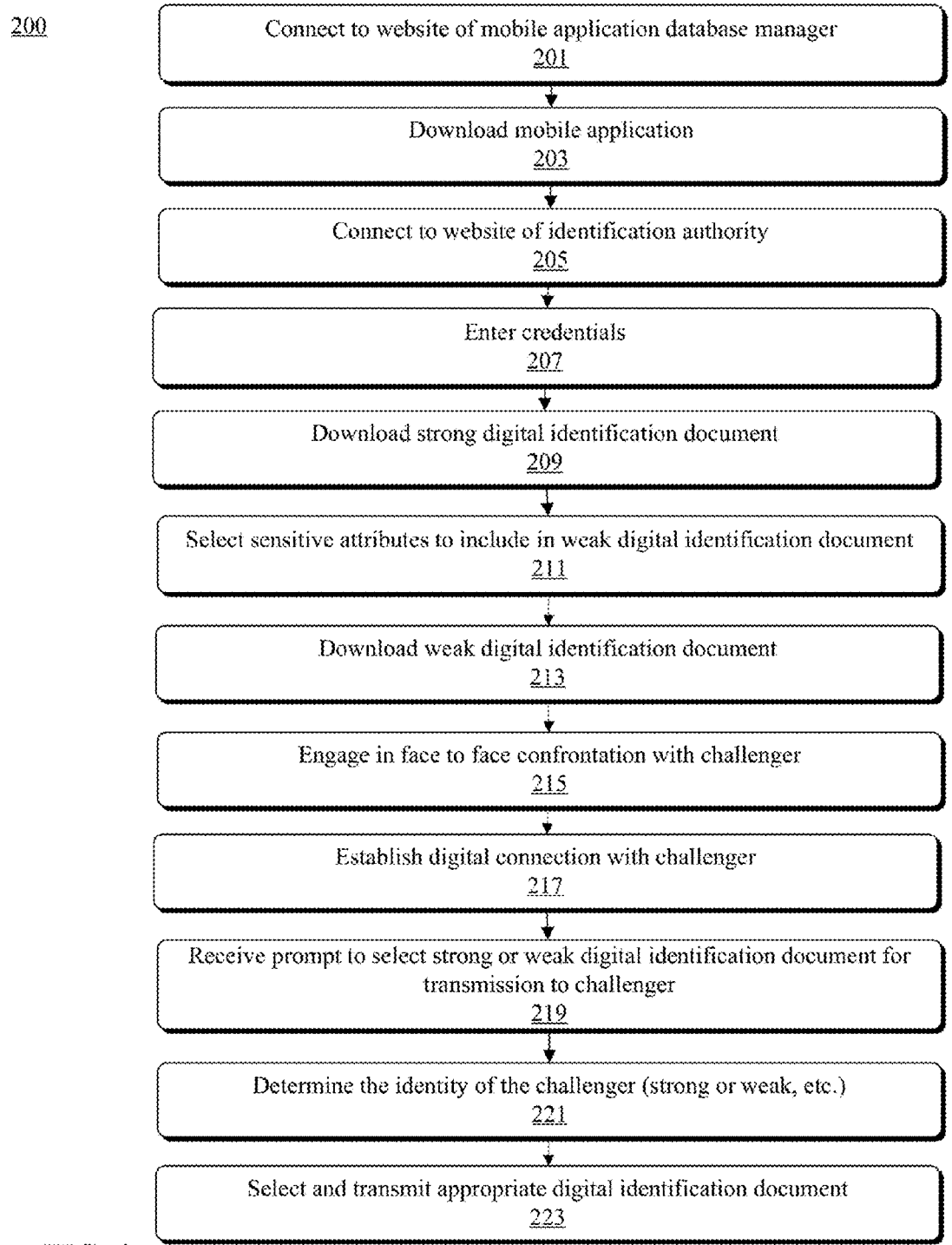
FIG. 2 is a flowchart of a method usable by an identified individual to obtain multiple digital identification documents and, thereafter, to select and transmit one of these documents during an interaction with a challenger, in accordance with embodiments of the present invention.

Turning now to FIG. 2, shown is a flowchart of a method 200 usable by an identified individual to obtain multiple digital identification documents and, thereafter, to select and transmit one of these documents in an interaction with a challenger, in accordance with embodiments of the present invention. Per 201, an identified individual uses his mobile device, for example mobile device 112 of FIG. 1, to connect to a website operated by a mobile application database manager. Once connected, per 203, the identified individual downloads a copy of the applicable mobile application onto his mobile device. Next, in 205, the identified individual uses his mobile device to connect to a second website, this one operated by an applicable identification authority. Per 207, the identified individual enters unique credentials associated with his account into a prompt box on the identification authority's website.

Once the identified individual has entered the proper credentials, he is provided access to a webpage from which he is able to download a strong digital identification document, per 209. As used herein, a strong digital identification document is one that includes more (or at least different) sensitive attributes than one or more corresponding weak identification documents. In some embodiments, the issuance of a strong identification document may be the default or primary setting for a given individual identification authority. Types of attributes that may be included in a strong identification document can include address, height, weight, birth date, hair color, eye color, license rights (or numbers associated with such license rights), user images, and age. In some embodiments, each strong identification document includes a set of attributes (i.e., one or more attributes) about a particular identified individual. In some embodiments, during generation, the strong identification document is digitally-signed using a private key of the identification authority.

In block 211, the identified individual may then be able to use a selection feature on the identification authority website to select attributes that he wishes to include in a weak digital identification document. In some embodiments, the selection feature be part of a user interface and may take the form of a menu of available attributes that can be individually selected by the identified individual for inclusion in the weak digital identification document. In some embodiments, the identified individual may be able to select subsets of attributes for inclusion in his weak identification document out of all of the available attributes about which the identification authority maintains records. For example, a particular identification authority could have seven separate available attributes to choose from and a particular identified individual might choose to include only three of those seven attributes in his weak identification document.

As used herein, a weak identification document may refer to a document that has fewer attributes (or at least less sensitive attributes) about an identified individual than a corresponding strong identification document. In some embodiments, a separate or additional fee may be charged by an identification authority to an identified individual seeking to obtain a weak identification document in addition to a standard or strong identification document. Additionally, an identified individual may only have a limited number of options for attributes to be included in (or excluded from) a weak identification document. An example of a weak identification document might be a state issued identification card that includes no attributes of an identified individual except his name, his image, and the fact that he is "Over 21".

Once the selection of attributes for inclusion in the weak identification document is concluded, the identification authority creates a weak identification document with the selected characteristics and, in some embodiments, digitally signs the completed document using its private key. Per 213, the weak identification document is then downloaded onto the mobile device of the identified individual. The process (i.e., 211 and 213) can be repeated with different weak identification documents that include different attributes. In some embodiments, this might result in a given identified individual having several identification documents that are useful for different situations (e.g., one for proving his age to a bartender, one for proving his address to a postal agent, one for proving his license number to a police officer, etc.).

It is further contemplated that, in some embodiments, digital identification documents for a given identified individual are not created by an identification authority until such identification documents are actually requested by the identified individual. Instead, all of the possible attributes about the identified individual that can be included in identification documents are maintained in one or more databases until the request for an identification document is made. At that time, the selected attributes can be retrieved and combined into an identification document as the document is created. In the alternative, the identification authority can actually maintain, in electronic storage, one or more digital identification documents for an identified individual, even before the identified individual makes a request to download such documents. The latter alternative may have the advantage of allowing an identified individual to receive a digital identification document in a more prompt manner upon his selection of attributes (because that particular document may have already been created). Further in some embodiments, an identified individual may choose to (or may be required to) download all of his mobile identification documents contemporaneously (e.g., during a single login session to an identification authority website).

Once he has his completed set of identification documents, the identified individual may be confronted by a challenger in a face to face interaction, per block 215. During the face to face interaction, a connection is established between the challenger's device (e.g., mobile phone, laptop, desktop computer, etc.) and the mobile device of the identified individual, per block 217. In block 219, the identified individual receives a prompt to select which digital identification document (out his set of available digital identification documents) he desires to produce to the challenger. This prompt may take the form of a graphic user interface or other user interface on the identified individual's mobile device. In some embodiments, the prompt may take the form of a menu of available identification documents. In order to determine the appropriate identification document to transmit, per 221, the identified individual considers the identity of the challenger (e.g., whether the challenger's purpose only requires information included on a weak identification document, whether the challenger is lawfully entitled to demand to see the strong identification document, etc.). Based on his determination, in block 223, the identified individual selects and transmits the appropriate identification document to the challenger's device. This identification document is then authenticated by the challenger, and the method is completed.

Figure 3:
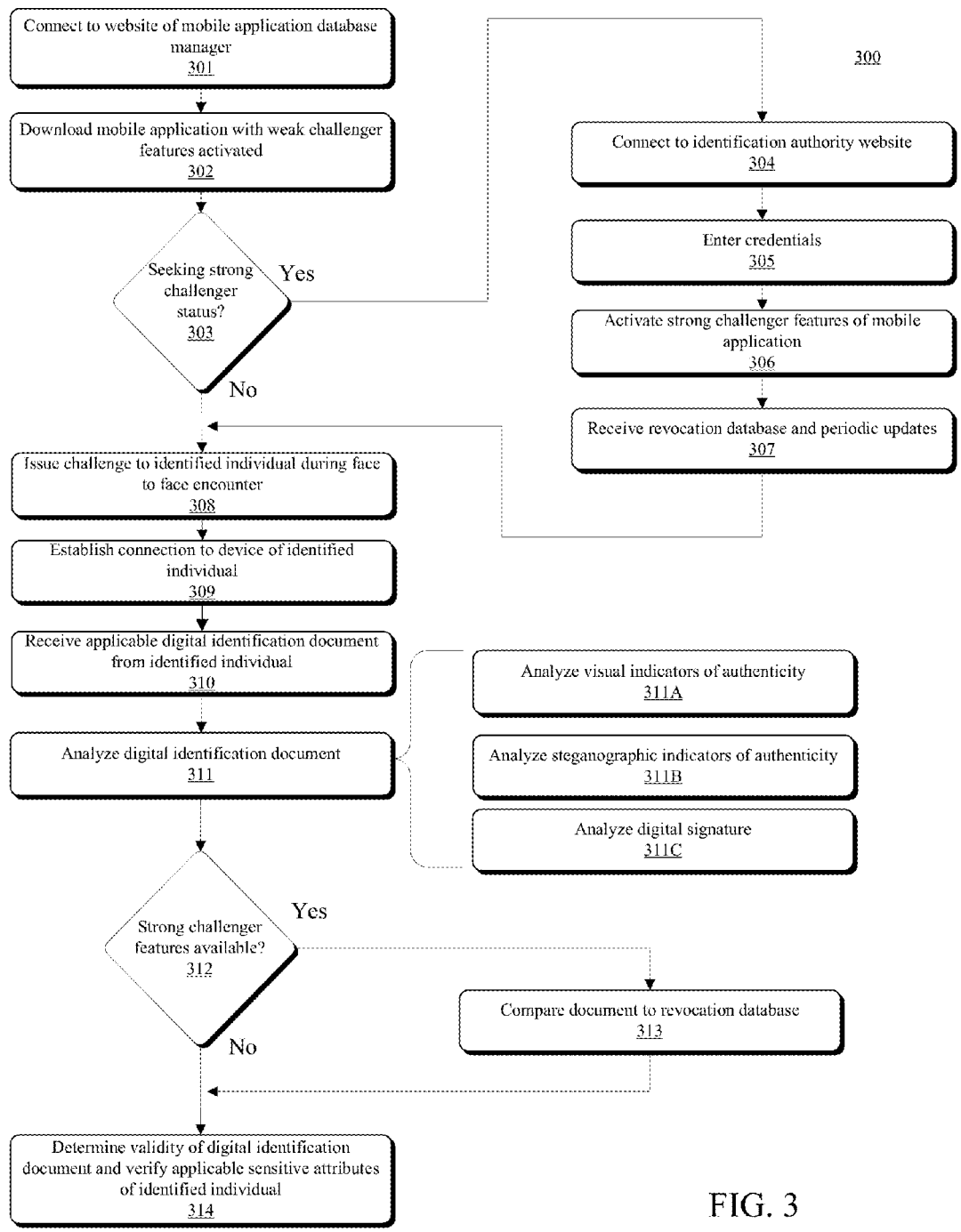
FIG. 3 is a flowchart of a method usable by a challenger to obtain a mobile application and, thereafter, challenge an identified individual and analyze his identification document, in accordance with embodiments of the present invention.

FIG. 3 is a flowchart of a method 300 usable by a challenger to obtain a mobile application on a mobile device and, thereafter, challenge an identified individual and analyze his identification document, in accordance with embodiments of the present invention. Per 301, a challenger connects to the website of a mobile application database manager. Once on the website, a mobile application is downloaded on his mobile device in block 302. As downloaded, the mobile application includes all of the features necessary for the challenger to verify digital identification documents issued by the corresponding identification authority to identified individuals. A public key, corresponding to a private key used by the identification authority to digitally sign the identification documents, may be included as part of the download.

Per block 303, the challenger determines whether he wishes to seek strong challenger status or whether the weak challenger features of the app are acceptable. In some embodiments, the challenger may only be entitled to seek strong challenger status if he is authorized by the identification authority or is otherwise legally entitled to do so. If the challenger desires to seek strong challenger status, he then connects to the website of the identification authority per block 304. Per 305, he enters the appropriate credentials to identify himself and prove that he is lawfully entitled to access strong challenger features. Upon entering his credentials, the strong challenger features are subject to activation on the challenger's mobile device, per block 306. These features may be activated by downloading additional software or by other applicable means.

In block 307, the strong challenger then receives, as a strong challenger feature, a revocation database. In addition, periodic updates to the database are also sent to the strong challenger's mobile device. Examples of strong challenger features include, the revocation database (including a list of identification documents that have been revoked before their scheduled expiration date), an arrest warrant database (including a list of identification documents that should trigger the challenger to arrest the identified individual), and a VIP list (including a list of identification documents that are linked to identified individuals to whom the challenger is required to provide special treatment). In some embodiments, a strong challenger feature may include a list of digital identification documents associated with identified individuals who have had one or more privileges revoked by an identification authority (e.g., a list of digital identification documents associated with individuals who have had their driving privileges suspended). Many other strong challenger features are also contemplated. Most of these features are characterized by providing special information about identified individuals to strong challengers during a challenge.

The special information provided via a strong challenger feature may only be provided to strong challengers (rather than to all challengers) in situations where the special information is not widely known or where some privacy interest is at stake. For example, a university (identification authority) may provide a student suspension list to its librarians (strong challengers) so that they know not to let suspended students check out books from the university library using university identification documents; however, the university may deem it inappropriate to provide such a list to campus store workers (weak challengers) who are supposed to let students buy goods from the campus store, regardless of any given student's academic status.

Once the strong challenger has received the revocation database, his mobile device is ready for use in challenges. Likewise, a weak challenger (foregoing the downloading of strong challenger features via blocks 304-307) may also have a mobile device that is ready for use in challenges. Per 308, the challenger issues a challenge to an identified individual. This may occur, for example, during a face to face encounter. To begin the challenge, a connection is established, per block 309, between the mobile device of the identified individual and the challenger's mobile device. This may occur, for example, via digital interaction 150 or 154 of FIG. 1. In some embodiments, this connection is through a secure short range communication medium (e.g., near field communication, Bluetooth connection, ad hoc wireless network, etc.). In some embodiments, the identified individual must have downloaded an appropriate mobile application prior to the encounter in order for the digital challenge to be possible. If the identified individual has not downloaded the appropriate application, then the challenge may occur in a more traditional manner (e.g., with the identified individual providing the challenger a laminated non-electronic identification document).

The identified individual then selects a desired digital identification document and sends a copy of the document to the challenger's mobile device. Per 310, the copy is received by the challenger's mobile device. Whether a strong or weak identification document is sent to the challenger may depend on a number of factors. For example, if the identified challenger only has a single identification document available, then that is the identification document that will be sent (i.e., the identified individual will have no choice in whether to send a strong or weak identification document). Also, if the challenger is a strong challenger (e.g., a police officer), then the identified individual may be required to select and transmit a strong identification document.

Per block 311, the challenger then uses the challenger's mobile device to analyze the transmitted identification document. Several components can be included in the identification document that may aid in this analysis. In some embodiments, valid identification documents incorporate certain visual indicators of authenticity (e.g., color patterns, holographic images, etc.), which are analyzed by the challenger, per block 311A. In addition, a copy of an identification document could have an expiration date that the challenger can use to verify that the document is not expired. Further, in some embodiments, identification documents incorporate steganographic indicators of authenticity. Per block 311B, the challenger's mobile device may be able to detect these steganographic indicators or be able to use these indicators to present a coherent image to the challenger (e.g., where digital watermarking is used) when the challenged identification document is valid. Further, per 311C, in some embodiments, valid identification documents use digital signatures (e.g., incorporated as part of a digital certificate) that are analyzed by the challenger to determine the validity of an identification document. This digital signature analysis may incorporate the use of an identification authority's public key (for example, a public key downloaded by the challenger in block 302).

Per decision block 312, a determination is made as to whether strong challenger features are available. If so, then per block 313 the strong challenger features are used to analyze the identification document. In this illustrated embodiment, this takes the form of comparing the identification document to the revocation database (downloaded in block 307) to determine whether the identification document has been revoked. This may be done manually by a strong challenger scrolling through the list of revoked identification documents on his mobile device or may be done automatically by an application running on his mobile device, without significant effort on the part of the challenger. After the strong challenger features are utilized, or immediately after block 311 (if no such features are available), the challenger is able to determine the validity of the identification document and use the document to verify sensitive attributes about the identified individual (e.g., verify that the identified individual is over 21). The challenger can be notified of the results of the challenge using a variety of different indicators. These can include, but are not necessarily limited to, displaying text or graphics (e.g., "fail" or "success"), generating audio (e.g., tones or voice), or combinations thereof.

Figure 4:
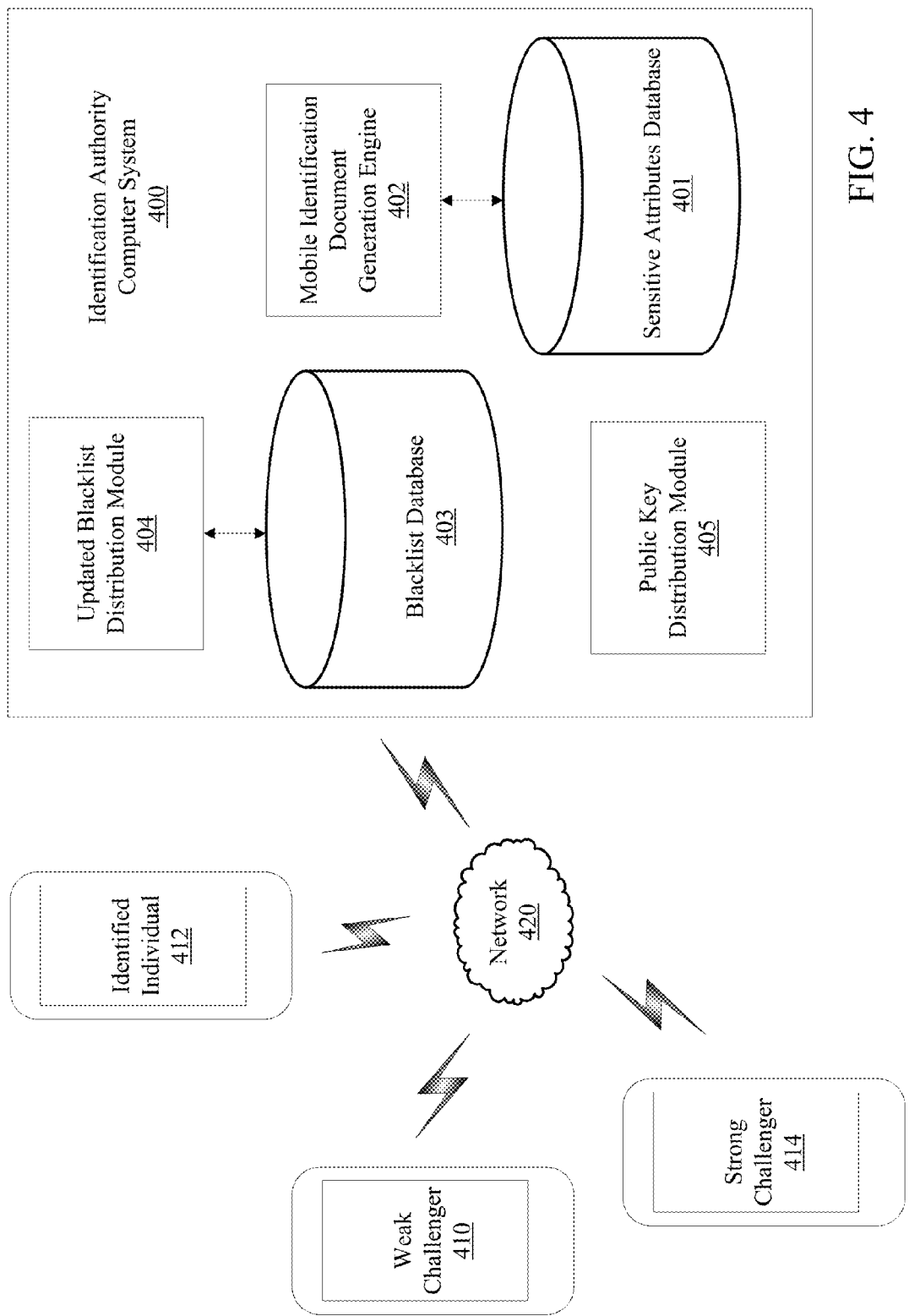
FIG. 4 is a diagrammatic illustration showing modules usable by a computer system of an identification authority during interactions with identified individuals and challengers, in accordance with embodiments of the present invention.

FIG. 4 is a diagrammatic illustration showing modules usable by a computer system 400 of an identification authority during interactions with identified individuals and challengers over an applicable network, in accordance with embodiments of the present invention. In some embodiments, the computer system 400 includes a sensitive attributes database 401 that includes information (e.g., attributes) about identified individuals. An identification document generation engine 402 obtains data about sensitive attributes from the attribute database 401 and uses that information to generate digitally-signed identification documents. The amount and type of information about an identified individual included in a given identification document may depend on a prior selection by the identified individual. This selection can be made by the identified individual using his device 412 in communication with computer system 400 over network 420. For example, an identified individual (mobile device 412) might request both a strong identification document including many sensitive attributes and a weak identification document including fewer sensitive attributes (e.g., only including age, image, and name). The generation engine 402 would then generate both documents and transmit them via network 420 to the identified individual's device 412.

Other components of computer system 400 include a blacklist database 403 that stores lists of identification documents associated with identified individuals with revoked privileges. The blacklist database 403 is used by updated blacklist distribution module 404 to send updated blacklists to strong challengers via network 420 including, for example, the strong challenger of device 414. Another component of identification authority computer system 400 is public key distribution module 405, which is usable by the identification authority to transmit public keys, corresponding to the private keys used to digitally sign identification documents, to challengers, including, for example, the weak challenger of device 410 and the strong challenger of device 414.

Figure 5:
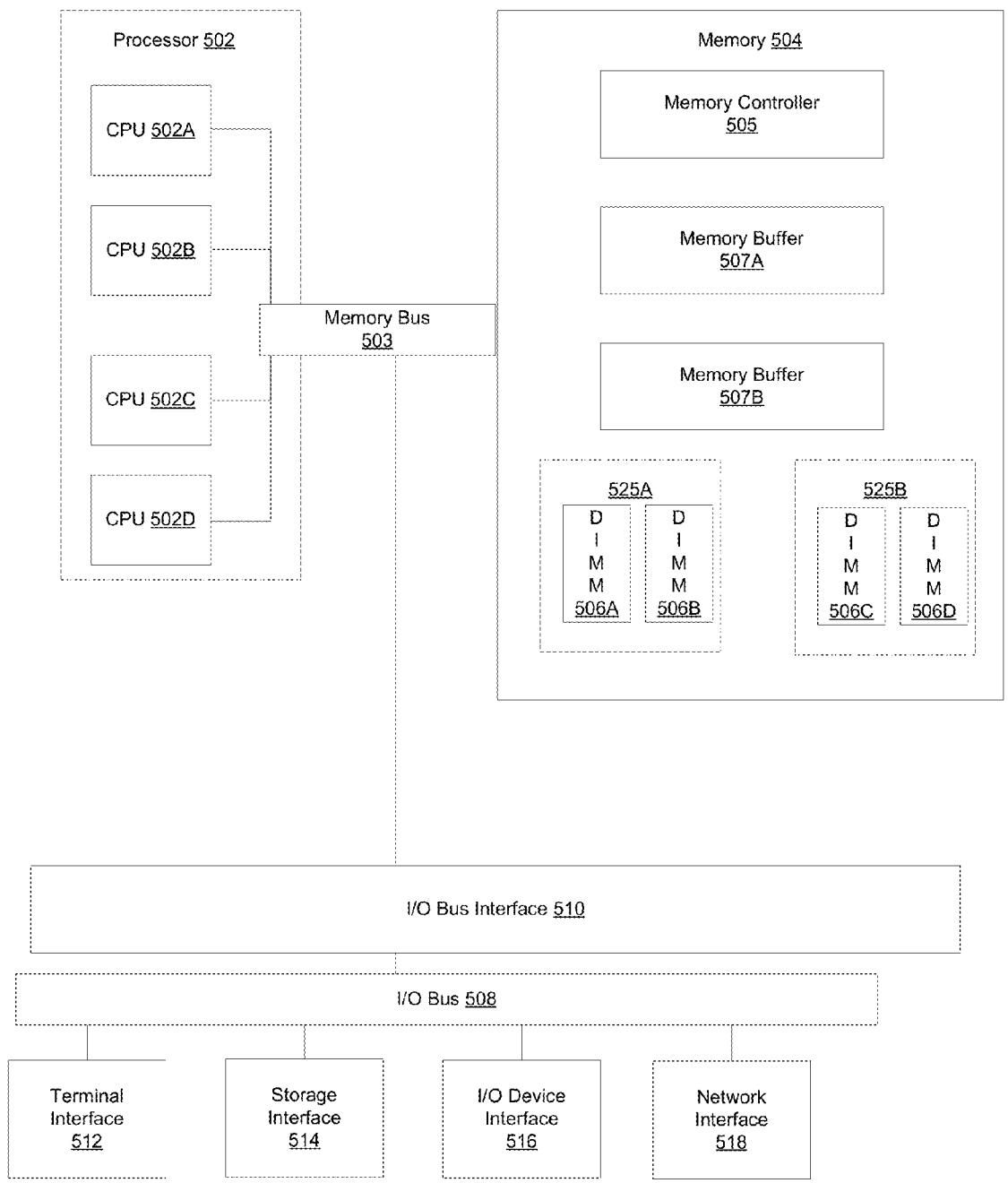
FIG. 5 depicts a high-level block diagram of an example computer system that may be used in implementing one or more embodiments of the present invention.

FIG. 5 depicts a high-level block diagram of an example computer system that could be used in implementing one or more embodiments of the present invention. For example, one or more computer systems described in reference to this figure could correspond to computer systems 102-114 of FIG. 1. The major components of the computer system 501 comprise one or more processors (i.e., CPUs) 502, a memory subsystem 504, a terminal interface 512, a storage interface 514, an I/O (Input/Output) device interface 516, and a network interface 518, all of which are communicatively coupled, directly or indirectly, for inter-component communication via a memory bus 503, an I/O bus 508, and an I/O bus interface unit 510.

The computer system 501 contains one or more general-purpose programmable central processing units (CPUs) 502A, 502B, 502C, and 502D, herein generically referred to as the CPU 502. In an embodiment, the computer system 501 contains multiple processors typical of a relatively large system; however, in another embodiment the computer system 501 alternatively is a single CPU system. Each CPU 502 executes instructions stored in the memory subsystem 504 and comprises one or more levels of on-board cache.

In an embodiment, the memory subsystem 504 comprises a random-access semiconductor memory, storage device, or storage medium (either volatile or non-volatile) for storing data and programs. In another embodiment, the memory subsystem 504 represents the entire virtual memory of the computer system 501, and also includes the virtual memory of other computer systems coupled to the computer system 501 or connected via a network. The memory subsystem 504 may be conceptually a single monolithic entity, but in other embodiments the memory subsystem 504 may be a more complex arrangement, such as a hierarchy of caches and other memory devices. For example, memory could exist in multiple levels of caches, and these caches could be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 504 contains elements for control and flow of memory used by the CPU 502. This includes all or a portion of the following: a memory controller 505, one or more memory buffers 507A and 507B and one or more memory devices 525A and 525B. In the illustrated embodiment, the memory devices 525A and 525B are dual in-line memory modules (DIMMs), which are a series of dynamic random-access memory (DRAM) chips 506A-506D (collectively referred to as 506)

mounted on a printed circuit board and designed for use in personal computers, workstations, and servers. The use of DRAMs 506 in the illustration is exemplary only and the memory array used may vary in type as previously mentioned. In various embodiments, these elements are connected with buses for communication of data and instructions. In other embodiments, these elements are combined into single chips that perform multiple duties or integrated into various types of memory modules. The illustrated elements are shown as being contained within the memory subsystem 504 in the computer system 501. In other embodiments the components are arranged differently and have a variety of configurations. For example, the memory controller 505 may be on the CPU 502 side of the memory bus 503. In other embodiments, some or all of them are on different computer systems and may be accessed remotely, e.g., via a network.

Although the memory bus 503 is shown in FIG. 5 as a single bus structure providing a direct communication path among the CPUs 502, the memory subsystem 504, and the I/O bus interface 510, the memory bus 503 could in fact comprise multiple different buses or communication paths, which are arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 could, in fact, contain multiple I/O bus interface units 510, multiple I/O buses 508, or both. While multiple I/O interface units are shown, which separate the I/O bus 508 from various communications paths running to the various I/O devices, in other embodiments some or all of the I/O devices are connected directly to one or more system I/O buses.

In various embodiments, the computer system 501 is a multi-user mainframe computer system, a single-user system, or a server computer or similar device that has little or no direct user interface, but receives requests from other computer systems (clients). In other embodiments, the computer system 501 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an exemplary computer system 501. But individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for example only and are not necessarily the only such variations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing digital identification documents, the system comprising:
   a first mobile device of an individual, the first mobile device configured to:
   provide a user interface whereby the individual can cause a first digital identification document of a plurality of digital identification documents identifying the individual to be created according to preferences of the identified individual by selecting for inclusion in a first set of attributes about the identified individual a first subset of available attributes among a plurality of available attributes about the identified individual and by causing the first mobile device of the identified individual to transmit the selection of the first subset of available attributes for inclusion in the first set of attributes to a computer system of a representative of an identification authority;
   receive from the computer system of the representative of the identification authority, the plurality of digital identification documents, each of the plurality of digital identification documents including a differing plurality of attributes about the identified individual and a digital signature, wherein the plurality of digital identification documents includes the first digital identification document that was created by the computer system of the representative of the identification authority in response to the receipt of the transmission of the selection of the first subset of available attributes for inclusion in the first set of attributes;
   provide the user interface, whereby the identified individual can make a selection of a digital identification document of the plurality of digital identification documents;
   transmit, based on the selection of the selected digital identification document, the selected digital identification document to a second mobile device of a first challenger, whereby the first challenger is able to determine the validity of the selected digital identification document by analyzing its digital signature;
   provide the user interface, whereby the identified individual can make a second selection of a second selected digital identification document of the plurality of digital identification documents; and
   transmit, based on the second selection, the second selected digital identification document from the first mobile device of the identified individual to a third mobile device of a second challenger, whereby the second challenger is able to determine the validity of the second selected digital identification document by analyzing its digital signature.

2. A method for managing digital identification documents, the method comprising:
   providing, by a first mobile device of an individual, a user interface whereby the individual can cause a first digital identification document of a plurality of digital identification documents identifying the individual to be created according to preferences of the identified individual by selecting for inclusion in a first set of attributes about the identified individual a first subset of available attributes among a plurality of available attributes about the identified individual and by causing the first mobile device of the identified individual to transmit the selection of the first subset of available attributes for inclusion in the first set of attributes to a computer system of a representative of an identification authority;
   receiving, by the first mobile device of the identified individual and from the computer system of the representative of the identification authority, the plurality of digital identification documents, each of the plurality of digital identification documents including a differing plurality of attributes about the identified individual and a digital signature, wherein the plurality of digital identification documents includes the first digital identification document that was created by the computer system of the representative of the identification authority in response to the receipt of the transmission of the selection of the first subset of available attributes for inclusion in the first set of attributes;

providing, by the first mobile device of the identified individual, the user interface, whereby the identified individual can make a selection of a digital identification document of the plurality of digital identification documents;

transmitting, by the first mobile device of the identified individual and based on the selection of the selected digital identification document, the selected digital identification document to a second mobile device of a first challenger, whereby the first challenger is able to determine the validity of the selected digital identification document by analyzing its digital signature;

providing, by the first mobile device of the identified individual, the user interface, whereby the identified individual can make a second selection of a second selected digital identification document of the plurality of digital identification documents; and transmitting, by the first mobile device of the identified individual and based on the second selection, the second selected digital identification document from the first mobile device of the identified individual to a third mobile device of a second challenger, whereby the second challenger is able to determine the validity of the second selected digital identification document by analyzing its digital signature.

3. A computer program product for managing digital identification documents, the computer program product comprising a computer readable hardware storage device having program instructions embodied therewith, the program instructions executable by at least one computer to cause the at least one computer to:

provide, by a first mobile device of an individual, a user interface whereby the individual can cause a first digital identification document of a plurality of digital identification documents identifying the individual to be created according to preferences of the identified individual by selecting for inclusion in a first set of attributes about the identified individual a first subset of available attributes among a plurality of available attributes about the identified individual and by causing the first mobile device of the identified individual to transmit the selection of the first subset of available attributes for inclusion in the first set of attributes to a computer system of a representative of an identification authority;

receive, by the first mobile device of the identified individual and from the computer system of the representative of the identification authority, the plurality of digital identification documents, each of the plurality of digital identification documents including a differing plurality of attributes about the identified individual and a digital signature, wherein the plurality of digital identification documents includes the first digital identification document that was created by the computer system of the representative of the identification authority in response to the receipt of the transmission of the selection of the first subset of available attributes for inclusion in the first set of attributes;

provide, by the first mobile device of the identified individual, the user interface, whereby the identified individual can make a selection of a digital identification document of the plurality of digital identification documents;

transmit, by the first mobile device of the identified individual and based on the selection of the selected digital identification document, the selected digital identification document to a second mobile device of a first challenger, whereby the first challenger is able to determine the validity of the selected digital identification document by analyzing its digital signature;

provide, by the first mobile device of the identified individual, the user interface, whereby the identified individual can make a second selection of a second selected digital identification document of the plurality of digital identification documents; and transmit, by the first mobile device of the identified individual and based on the second selection, the second selected digital identification document from the first mobile device of the identified individual to a third mobile device of a second challenger, whereby the second challenger is able to determine the validity of the second selected digital identification document by analyzing its digital signature.

\* \* \* \* \*